United States Patent
Levit et al.

(10) Patent No.: US 7,103,348 B1
(45) Date of Patent: Sep. 5, 2006

(54) MOBILE STATION (MS) MESSAGE SELECTION IDENTIFICATION SYSTEM

(75) Inventors: Guy Levit, Tel-Aviv (IL); Noam Camiel, Tel-Aviv (IL); Eli David, Tel-Aviv (IL); Gil Shapira, Tel Aviv (IL)

(73) Assignee: Telemessage Ltd., Savion (IL)

( * ) Notice: Subject to any disclaimer, the term of this patent is extended or adjusted under 35 U.S.C. 154(b) by 0 days.

(21) Appl. No.: 09/448,180

(22) Filed: Nov. 24, 1999

(51) Int. Cl.
*H04Q 7/22* (2006.01)

(52) U.S. Cl. .................................... 455/412.1; 455/413

(58) Field of Classification Search ............... 455/466, 455/415, 412, 414, 422, 575, 445, 406, 458, 455/459, 564, 460; 379/88.15, 213.01, 216.01; 340/407.1, 7.6, 7.53, 333.005, 90.01, 72.07, 340/213.01, 88.13, 216.01
See application file for complete search history.

(56) References Cited

U.S. PATENT DOCUMENTS

| | | | | |
|---|---|---|---|---|
| 5,457,732 A | * | 10/1995 | Goldberg | 340/7.23 |
| 5,487,111 A | * | 1/1996 | Slusky | 379/211.03 |
| 5,559,862 A | * | 9/1996 | Bhagat et al. | 455/460 |
| 5,671,269 A | * | 9/1997 | Egan et al. | 379/67.1 |
| 5,754,628 A | * | 5/1998 | Bossi et al. | 379/88.12 |
| 5,764,731 A | * | 6/1998 | Yablon | 379/88.13 |
| 5,832,060 A | * | 11/1998 | Corlett et al. | 379/88.19 |
| 5,933,478 A | * | 8/1999 | Ozaki et al. | 379/93.24 |
| 5,963,876 A | * | 10/1999 | Manssen et al. | 455/564 |
| 6,055,305 A | * | 4/2000 | Norman et al. | 379/210 |
| 6,118,994 A | * | 9/2000 | Usami et al. | 455/412 |
| 6,147,977 A | * | 11/2000 | Thro et al. | 370/265 |
| 6,181,928 B1 | * | 1/2001 | Moon | 455/415 |
| 6,184,796 B1 | * | 2/2001 | Rivero et al. | 340/407.1 |
| 6,188,751 B1 | * | 2/2001 | Scherer | 379/88.22 |
| 6,240,391 B1 | * | 5/2001 | Ball et al. | 704/270 |
| 6,246,871 B1 | * | 6/2001 | Ala-Laurila | 455/413 |
| 6,304,565 B1 | * | 10/2001 | Ramamurthy | 370/352 |
| 6,389,276 B1 | * | 5/2002 | Brilla et al. | 455/413 |

* cited by examiner

*Primary Examiner*—Temica Beamer
*Assistant Examiner*—Joy K. Contee
(74) *Attorney, Agent, or Firm*—Pearl Cohen Zedek Latzer, LLP

(57) ABSTRACT

A method for identifying a message selection made at a mobile station (MS), the method including the steps of uniquely associating an inbound telephone number with a message, attaching the inbound telephone number to the message, sending the message and the attached inbound telephone number to an MS using an MS telephone number associated with the MS, maintaining a unique association between the message, the inbound telephone number, and the MS telephone number, selecting the message at the MS, calling from the MS the inbound telephone number attached to the selected message, identifying the inbound telephone number of the telephone call, identifying the MS telephone number of the telephone call, and identifying the message associated with the inbound telephone number and the MS telephone number, thereby identifying the message selection made at the MS.

21 Claims, 2 Drawing Sheets

US 7,103,348 B1

MOBILE STATION (MS) MESSAGE SELECTION IDENTIFICATION SYSTEM

FIELD OF THE INVENTION

The present invention relates to telecommunications in general, and more particularly to a system for identifying a message selection at a mobile station (MS).

BACKGROUND OF THE INVENTION

Cellular telephone communications protocols, such as the Short Message Service (SMS), also known as PCS Messaging, Text Messaging, Voice Mail Plus, Cellular Message Teleservice (CMT), and Cellular Alpha Paging, allow for the transmission of short text-only messages to a cellular telephone, referred to herein as a mobile station (MS). In the SMS protocol a telephone number may be attached to an SMS message that is sent to an MS, allowing the recipient of an SMS message to replay to the message, either by dialing the telephone number indicated, or, in some implementations, simply by pressing the "SEND" button or otherwise initiating a telephone call from the MS without dialing the telephone number. In those implementations that support it, initiating a telephone call while displaying an SMS message to which a telephone number has been attached will cause the telephone number to be automatically dialed.

Some commercial message services employ known computer telephony integration (CTI) techniques to enable a subscriber to receive voice mail, email, and other types of messages at a central computer server which then forwards notifications of the arrival of such messages to the subscriber's MS in the form of SMS messages. The SMS message may simply be a generic notification that a message has been received for the subscriber at the server, or may contain a portion of the message in a text format, aiding the subscriber in identifying the sender and/or determining the message's importance to the subscriber. In order to hear the full message the subscriber may then call the message service by dialing a telephone number known to the subscriber or, where the telephone number of the message service is attached to each SMS message, by pressing the "SEND" button or otherwise initiating the call as described above.

Once the message service has been contacted, the subscriber must identify the message that the subscriber wishes to hear. This may be done by reading the content of the SMS message to a operator or by navigating an automated menu system that is responsive to voice commands or dual tone multi-frequency (DTMF) signals. In the case of an automated menu system, the subscriber generally must listen to a portion of each message received and then provide an indication whether or not the subscriber wishes to hear the complete message. Where tens of SMS message notifications are received at an MS, navigating such a menu system is tedious and time-consuming.

SUMMARY OF THE INVENTION

The present invention seeks to provide a system for identifying a message selection made at a mobile station (MS) that overcome disadvantages of the prior art described hereinabove. A system is provided whereby a unique telephone number is attached to each message sent to an MS from a central server. Each telephone number connects the subscriber to the central server along a different telephone line. When the subscriber presses the "SEND" button or otherwise initiates the call the telephone number which is attached to the currently-displayed message is automatically dialed. By identifying the telephone number of the telephone line on which the incoming call is received, and by identifying the telephone number of the subscriber using automatic number identification (ANI) techniques, the server may identify the message that is currently displayed on the subscriber's MS without receiving further input by the subscriber. The full message associated with the identified message may then be provided to the subscriber via audio link. In this manner a subscriber may hear the full message associated with a currently-displayed message simply by pressing the "SEND" button or otherwise initiating a call.

There is thus provided in accordance with a preferred embodiment of the present invention a method for identifying a message selection made at a mobile station (MS), the method including the steps of uniquely associating an inbound telephone number with a message, attaching the inbound telephone number to the message, sending the message and the attached inbound telephone number to an MS using an MS telephone number associated with the MS, maintaining a unique association between the message, the inbound telephone number, and the MS telephone number, selecting the message at the MS, calling from the MS the inbound telephone number attached to the selected message, identifying the inbound telephone number of the telephone call, identifying the MS telephone number of the telephone call, and identifying the message associated with the inbound telephone number and the MS telephone number, thereby identifying the message selection made at the MS.

Further in accordance with a preferred embodiment of the present invention the uniquely associating step includes uniquely associating a different inbound telephone number with each of a plurality of messages destined for the MS.

Still further in accordance with a preferred embodiment of the present invention the selecting step includes displaying the message on a display.

Additionally in accordance with a preferred embodiment of the present invention the calling step includes activating a calling mechanism at the MS which automatically dials the inbound telephone number attached to the selected message.

Moreover in accordance with a preferred embodiment of the present invention the inbound telephone number step includes determining via which telephone line the telephone call is received and identifying the inbound telephone number associated with the telephone line.

Further in accordance with a preferred embodiment of the present invention the identifying the MS telephone number step includes identifying using Automatic Number Identification (ANI).

Still further in accordance with a preferred embodiment of the present invention the message is a Short Message Service (SMS) message.

There is also provided in accordance with a preferred embodiment of the present invention a method for outputting an underlying message based on the identification of an associated message, the method including the steps of creating an associated message identifying an underlying message, uniquely associating an inbound telephone number with the associated message, attaching the inbound telephone number to the associated message, sending the associated message and the attached inbound telephone number to an MS using an MS telephone number associated with the MS, maintaining a unique association between the underlying message, the inbound telephone number, and the MS telephone number, selecting the associated message at the MS, calling from the MS the inbound telephone number attached to the selected message, identifying the inbound telephone number of the telephone call, identifying the MS telephone number of the telephone call, identifying the underlying message associated with the inbound telephone number and the MS telephone number, and outputting the underlying message.

Further in accordance with a preferred embodiment of the present invention the creating step includes forming the associated message from any of a body portion and a header portion of the underlying message.

Still further in accordance with a preferred embodiment of the present invention the creating step includes forming the associated message using optical character recognition (OCR) on a printed form of the underlying message.

Additionally in accordance with a preferred embodiment of the present invention the creating step includes forming the associated message using speech-to-text conversion on a spoken form of the underlying message.

Moreover in accordance with a preferred embodiment of the present invention the outputting step includes performing text-to-speech conversion on the underlying message.

Further in accordance with a preferred embodiment of the present invention the outputting step includes playing an audio recording of the underlying message.

Still further in accordance with a preferred embodiment of the present invention the associated message is a Short Message Service (SMS) message.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
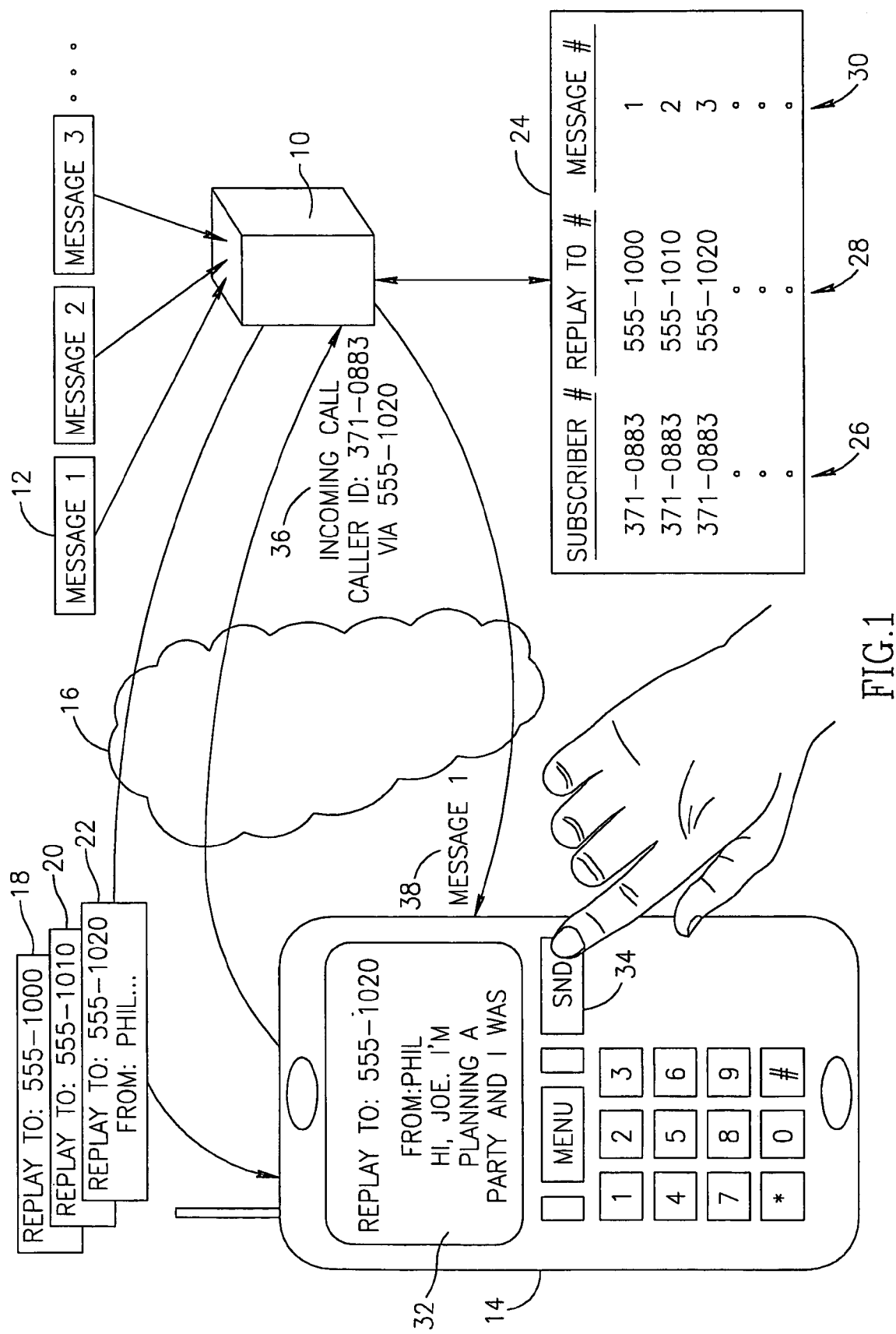
FIG. 1 is a simplified illustration of a system for identifying a message selection at a mobile station (MS), constructed and operative in accordance with a preferred embodiment of the present invention.

Reference is now made to FIG. 1 which is a simplified illustration of a system for identifying a message selection at a mobile station (MS), constructed and operative in accordance with a preferred embodiment of the present invention. Although the preferred embodiment is described with particular reference to the SMS messaging protocol, it is appreciated that the present invention may be applied to any messaging protocol which allows for a telephone number to be attached to a message and which allows the telephone number to be automatically dialed as described hereinbelow. In the system of FIG. 1 a server 10 is provided to receive messages 12 destined for a subscriber at a mobile station (MS) 14. Messages 12 may be email messages, voice mail messages, SMS messages, ICQ messages, fax messages, or any other kind of text, graphic, or audio message, or any combination thereof. Server 10 may receive messages 12 using any suitable means known in the art, such as by telephonic connection to server 10, or via a network, such as the Internet. Each message 12 typically includes the telephone number of MS 14 and/or an identifier associated with MS 14's telephone number as maintained by server 10.

Server 10 preferably creates an SMS message for each message 12 received. The SMS message may be a generic message indicating simply that a message has been received, or may include a portion of the message header where there is one, a portion of the message body, or a combination thereof. Where message 12 is a voice message, speech-to-text conversion may be used to create the SMS text message from message 12 using conventional techniques Where message 12 is a fax message, optical character recognition (OCR) may be used to create the SMS text message from message 12 using conventional techniques. Once an SMS message is created, a telephone number, referred to herein as an inbound telephone number, is attached to the SMS message. The inbound telephone number is uniquely associated with the SMS message in that no two SMS messages destined for MS 14 will have the same inbound telephone number attached to it. Each SMS message, together with its attached inbound telephone number, is then typically sent to MS 14 via a cellular telephone network 16 using MS 14's telephone number which is identified as described hereinabove. In FIG. 1 three SMS messages 18, 20, and 22 are shown being sent from server 10 to MS 14 via network 16.

Server 10 preferably maintains a unique association between each underlying message 12 and/or its associated SMS message, the inbound telephone number attached to the SMS message, and the telephone number of the MS to which the SMS message is sent in a table 24, where each record preferably comprises an MS telephone number 26, an inbound telephone number 28, and a message identifier 30.

SMS messages received at MS 14 are typically viewed on a display 32. In a preferred embodiment a subscriber "selects" an SMS message whose associated underlying message the subscriber wishes to hear in full by presenting the SMS message for viewing on display 32. The subscriber then initiates a call from MS 14, such as by pressing a "SEND" button 34. MS 14 preferably automatically dials the inbound telephone number attached to the selected SMS message, being 555-1020 of SMS message 22 in the illustration. The incoming call, represented at reference numeral 36, is then received at server 10. The inbound telephone number of the incoming call may be identified by server 10 as the inbound telephone number is already known by server 10 to be associated with that particular incoming telephone line. The telephone number of the incoming call may be determined using conventional caller ID techniques such as Automatic Number Identification (ANI).

Thus, having determined the inbound telephone number of the incoming call, being 555-1020 in the illustration, and the telephone number of the caller, being the telephone number of MS 14 in the illustration, the SMS message selected at MS 14 is, in effect, identified, and, therefore, the underlying message associated with the selected SMS message may be identified in table 24 and output to MS 14, as is shown at reference numeral 38, as an audio message, using conventional text to-speech techniques as necessary to convert message 12 where message 12 is a text message. Then, in accordance with conventional message playback systems, the message may be replied to, forwarded, etc.

Figure 2:
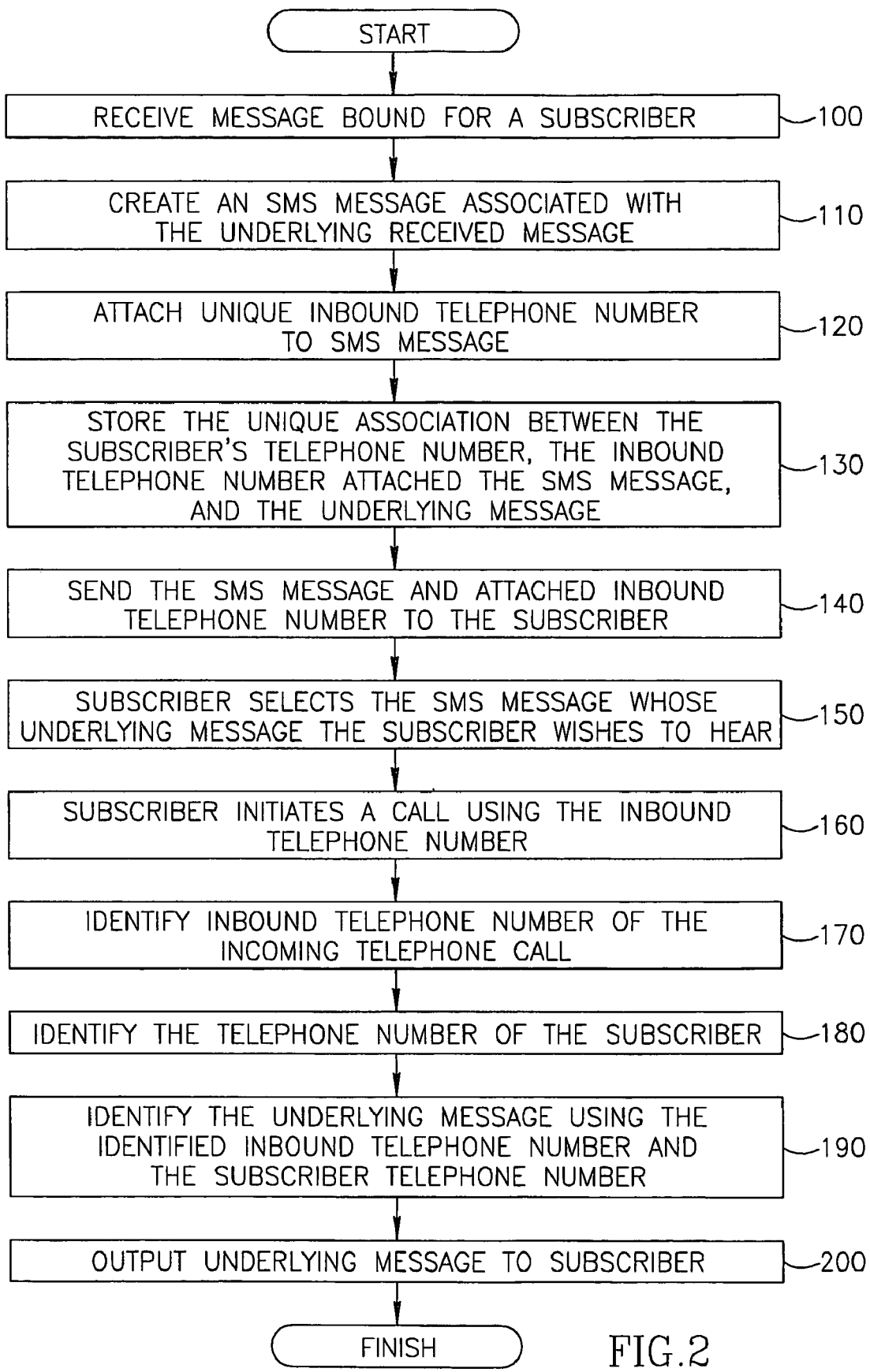
FIG. 2 is a simplified flowchart illustration of a method of operation of the system of FIG. 1, operative in accordance with a preferred embodiment of the present invention.

Reference is now made to FIG. 2 which is a simplified flowchart illustration of a method of operation of the system of FIG. 1, operative in accordance with a preferred embodiment of the present invention. In the method of FIG. 2, a message bound for a subscriber is received (step 100) and an SMS message associated with the underlying received message is created (step 110) A unique inbound telephone number is attached to the SMS message (step 120) and the unique association between the subscriber's telephone number, the inbound telephone number attached to the SMS message, and the underlying message is stored in a table (step 130). The SMS message and attached inbound telephone number is then sent to the subscriber (step 140). The subscriber selects the SMS message whose underlying message the subscriber wishes to hear (step 150) and initiates a call using the inbound telephone number (step 160). The inbound telephone number of the incoming telephone call from the subscriber is identified from the telephone line on which the telephone call is received (step 170). The telephone number of the subscriber is then identified using a caller identification technique (step 180). The underlying message is then identified in the table using the identified inbound telephone number and the subscriber telephone number (step 190) and output to the subscriber (step 200).

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method of providing access to a specific message stored on a server, comprising:
    generating a unique message pointer associated with said specific message stored on said server; and
    sending said message pointer to an address of at least one given subscriber, said subscriber being part of a group of subscribers
    wherein said at least one given subscriber may use said message pointer in combination with a subscriber's address identifier associated with said at least one given subscriber to enable access to said message without having to input any additional data,
    wherein said unique message pointer is further associated with a specific subscriber from said group of subscribers,
    wherein said generating further comprises, for each of said at least one given subscriber, generating a unique message pointer, and
    wherein said unique message pointer is associable with two or more subscribers.

2. A method according to claim 1, wherein each of said at least one given subscriber is associated with a predefined number of unique message pointers.

3. A method according to claim 2, wherein for each of said at least one given subscriber, after said predetermined number of unique message pointers is selected, at least one of said unique message pointers is made available to be reused for providing direct access to a second message stored on said server and associated with said at least one given subscriber.

4. A method according to claim 3, wherein after said predetermined number of unique message pointers is selected, said at least one unique message pointer is disassociated from said specific message.

5. A method according to claim 4, wherein said message pointer comprises a telephone number.

6. A method according to claim 5, wherein said telephone number is selected from a bank of telephone numbers, and wherein each of said telephone numbers is associated with a distinct telephone line.

7. A method according to claim 6, further comprising initiating a communication session using said telephone number over a specific telephone line specifically associated with said message.

8. A method according to claim 7, wherein said subscriber's address identifier comprises a subscriber's telephone number.

9. A method according to claim 8, further comprising identifying said subscriber's telephone number upon the initiation of said communication session.

10. A method according to claim 9, further comprising providing access to said specific message stored on said server upon the identification of said subscriber's telephone number.

11. A method according to claim 7, wherein said subscriber's address identifier is an identifier selected from a group consisting of a URL, an e-mail, an instant message, an SMS, an EMS, an MMS and a telephone number specifically associated with said message, and wherein access to said specific message stored on said server is provided upon the identification of said identifier.

12. A method according to claim 10, further comprising allowing said subscriber to replay said specific message stored on said server.

13. A method of providing access to a specific message stored on a server, comprising:
    linking a message stored on said server with a first specific network address associated with said specific message and further associated with a given subscriber;
    sending said first specific network address to said given subscriber's address; and
    using said first specific network address to initiate a communication session with said communication device at said first specific network address;
    wherein upon the identification of said given subscriber's address access to said stored message is provided without having to input any additional data, and
    wherein said linking further comprises linking said message stored on said server with a second specific network address associated with said specific message and further associated with a second given subscriber.

14. A method according to claim 13, wherein said first and said second network addresses are identical.

15. A method according to claim 14, wherein said first and said second network addresses are distinct.

16. A method according to claim 13, wherein said first specific network address is a telephone number specifically associated with said message.

17. The method of claim 16, wherein said given subscriber's address is a specific subscriber's telephone number.

18. The method of claim 17, further comprising initiating a communication session using said telephone number over a specific telephone line specifically associated with said message.

19. The method of claim 18, wherein said direct access to said stored message is provided for incoming communication sessions over said specific telephone line.

20. The method of claim 19, wherein said direct access to said stored message is provided only upon the identification of said given subscriber's telephone number.

21. The method of claim 13, wherein said specific network address is an identifier selected from a group consisting of a URL, an e-mail, an instant message, an SMS, an EMS, an MMS and a telephone number specifically associated with said message.

* * * * *